Oct. 16, 1923.
B. H. BLOOD
GAUGE
Filed Jan. 22, 1920
1,470,802
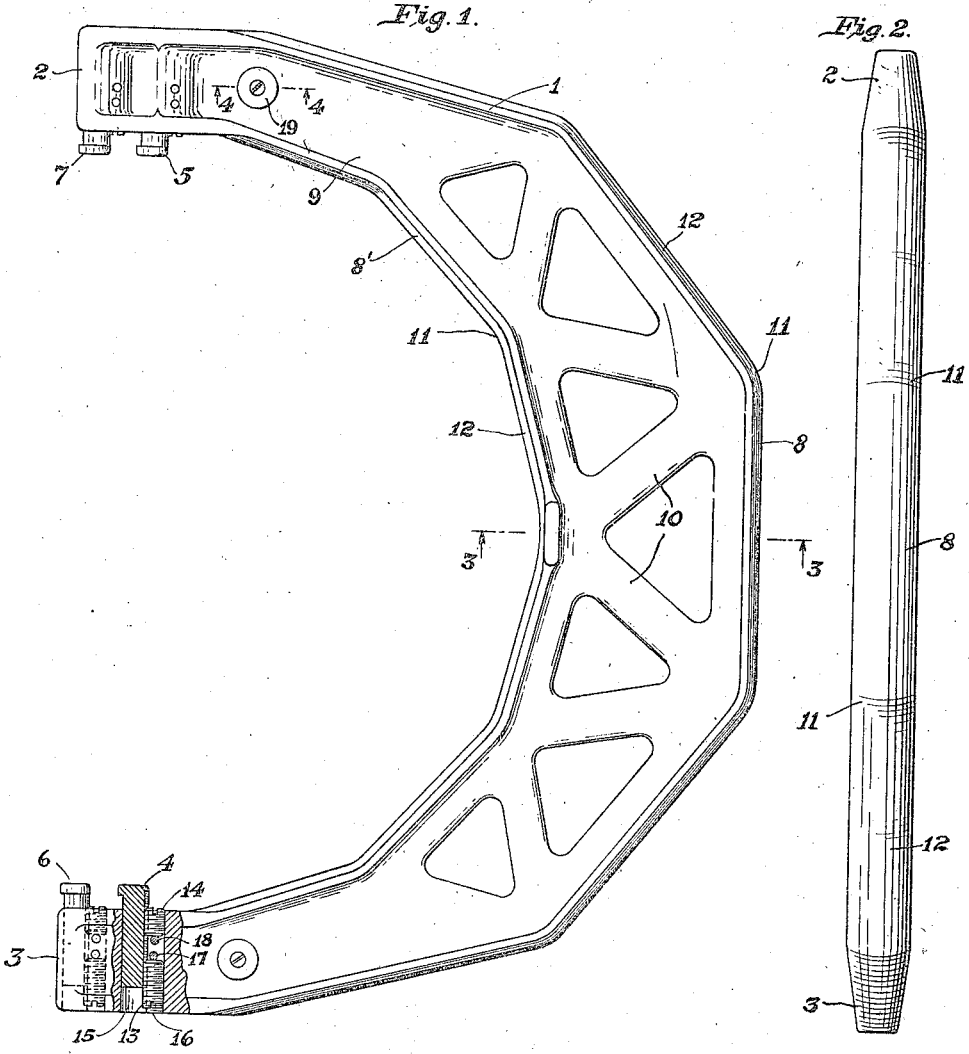
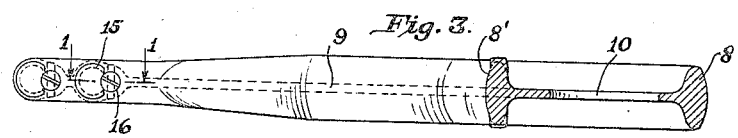
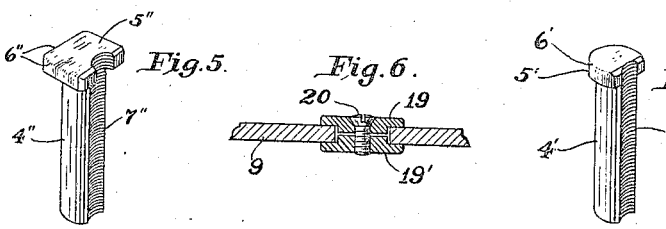
Inventor
Bryant H. Blood
By S. Jay Teller
Attorney.

Patented Oct. 16, 1923.

1,470,802

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GAUGE.

Application filed January 22, 1920. Serial No. 353,379.

*To all whom it may concern:*

Be it known that I, BRYANT H. BLOOD, a citizen of the United States, residing at Hartford, in the county of Hartford and State of Connecticut, have invented certain new and useful Improvements in Gauges, of which the following is a specification.

While not necessarily so limited, the invention is particularly applicable to gauges of the opposed contact type, especially limit gauges having two or more pairs of opposed contacts. The object of the invention is to provide a gauge, especially of the opposed contact, type, having the frame constructed in a novel manner to provide great rigidity with minimum weight, and having improved means whereby one or more of the contact members may be easily and accurately adjusted and rigidly locked in adjusted positions. In accordance with the invention, I provide two independently acting adjusting devices for each adjustable contact member so that the member may be positively moved in either direction, these adjusting devices serving to lock the member after adjustment.

With the above general object in view, as well as others which may be more specifically related hereinafter, the invention resides in the following structure which is shown in the drawing as illustrative of the invention and is not to be construed in a limiting sense thereof.

Referring to the figures of the drawing:

Figure 1 is a side view of the gauge showing one of the gauge contact members and its adjusting mechanism in section, such section being taken on the line 1—1 of Fig. 3.

Fig. 2 is a rear edge view thereof.

Fig. 3 is a view taken on the line 3—3 of Fig. 1.

Fig. 4 is an enlarged detail view of one of the gauge contact members.

Fig. 5 is a view similar to Fig. 4 but showing a modified form of contact member.

Fig. 6 is a detailed sectional view taken on the line 4—4 of Fig. 1 and illustrating a marker adapted to be attached to the gauge to indicate the measuring dimensions to which the gauge is set.

Referring to the drawing, 1 represents the main frame or body of the gauge and in the case of a gauge of the opposed contact type, as illustrated, this gauge body is, in general, U-shaped in form and comprises opposite arms 2 and 3. When the gauge is of this type there is a pair of opposed contact members or anvils mounted respectively in the arms 2 and 3, and by preference there are a plurality of pairs of such contact members, thus adapting the gauge for use as a limit gauge. As illustrated, there are two pairs of opposed contact members 4 and 5 and 6 and 7 respectively. At least one member of each pair is adjustable, and preferably, as shown, both members are adjustable. Each of these contact members is of the same construction and comprises a shank portion and a head portion which may be of any preferred form; however, as illustrated in Figs. 1 and 2, the contact member preferably comprises a shank 4' and a flanged end forming a head 5'. The work-engaging edge of this head is preferably rounded off as shown at 6' and the shank is threaded longitudinally at 7' to receive the adjusting members to be hereinafter described.

The modified form of contact member shown in Fig. 5 is similar to that shown in Figs. 1 and 4, the head 5'' thereof, however, being square instead of round. The work-engaging edge is preferably rounded off as shown at 6'' and the shank 4'' is threaded longitudinally at 7'' to receive the adjusting members.

As heretofore briefly stated, I prefer to make the gauge frame of a novel improved construction and Fig. 1 of the drawing generally illustrates this feature of my invention. In this construction, the frame comprises outer and inner flanges 8 and 8' respectively connected by the web 9, these flanges preferably being formed along straight lines as illustrated, whereby a much firmer hand grip by the user may be had on the gauge particularly when the hand of the user is oily and slippery. These outer and inner flanges are wide and thick as shown in Fig. 3 and are integrally connected by the web 9 in such manner as to from a strong frame to rigidly and accurately support the gauge arms at the ends thereof. In order to secure minimum of weight of the gauge, particularly in large gauges, while at the same time maintaining its strength and rigidity, I preferably form the web of an open or lattice shape as generally illustrated in Fig. 1, thus providing a plurality of integral braces 10 between the two ribs. It will be noted that these braces are straight and the arrangement is such that two braces extend from each corner 11 of the gauge flanges 8 and 8′, and are integrally joined to the flange at such corner and diverge outwardly therefrom in the shape of a V to the other flange, preferably to a corner on such flange, as shown. In order to provide for this arrangement of the braces for the purpose of securing the maximum rigidity, each flange 8 and 8′ respectively is preferably provided with a straight portion 12 opposite each corner 11 of the opposed flange, whereby each flange 8 and 8′ in connection with the two adjacent braces 10 provides a triangular cell or opening within the web 9. By this construction, the flanges are securely braced against relative movement in such manner as to maintain the strength and rigidity of the gauge while considerably lightening its weight, such feature being of particular importance in gauges of large size.

The adjusting mechanisms for all of the adjustable contact members are similar, and a detailed description of one of these mechanisms will be sufficient. Each of the contacts, as for instance 4, is lineally movable, and there are two independent devices which engage it and which act in opposite directions thereon to adjust it and lock it in adjusted position. Preferably these adjusting devices are in the form of screws 13 and 14. In the preferred embodiment of the invention these screws are held against longitudinal movement and have threaded engagement directly with the contact member. The two adjusting devices or screws together with the major portion of the contact member are positioned within an opening in the gauge body. In order to provide a simple and compact construction, this opening consists of two intersecting bores 15 and 16, one adapted to receive and fit the contact member, and the other adapted to receive and fit the exteriors of the screws 13 and 14. Inasmuch as the two bores intersect, a sector of the contact member is concaved and is threaded along the concaved portion so as to be adapted to be engaged by the screws, whereby the contact member is held from rotation within the gauge and may be adjusted longitudinally and locked in adjusted position. When the screws have direct threaded engagement with the contact member, as shown, it is necessary to hold them against longitudinal movement. This may be done by providing an abutment, integral with the frame 1 or otherwise, within the bore 16, preferably at the inner ends of the screws. I prefer to provide a non-integral abutment means secured within the opening, and as illustrated, this abutment means consists of two separate pins 17 and 18 extending through transverse holes in the gauge body adapted to serve respectively as abutments for the screws 13 and 14. It will be seen that when the screws are tightened they bear against their respective pins 17 and 18 and act in opposite directions on the contact member 4, thus securely locking it against lineal movement.

The provision of the two pins 17 and 18, one for each screw, is of great importance. If only a single pin were provided for both screws and such pin became loose, the contact member would be allowed to move therewith, since the pin abutment is the only means holding the member in place. However, with the present two-pin arrangement, if one pin does become loose it does not affect the accuracy of the gauge since the bearing of each screw on its pin is always in the same direction and each pin is entirely separate from the other.

If it is desired to adjust a contact member inward, the screw 13 is first loosened and the screw 14 then screwed inward. Since the screw 14 cannot move longitudinally inward within the bore because of its seating on pin 18, the effect of this inward turning of the screw is to draw the gauge member 4 out of the bore. When properly adjusted the member may be locked by tightening the screw 13. If it is desired to move the member outward, the screw 14 is first loosened and the screw 13 screwed inward, the general operation being the same as above described.

It will be seen that a gauge constructed as herein shown and described can be readily adjusted for work of different dimensions. When two pairs of contacts are provided, as shown, the gauge can be used as a "go" and "no go" limit gauge, and the contacts can be readily changed for different tolerances. After the gauge has been adjusted in the tool room it can be sealed by placing sealing wax in the several bores 15 and 16.

Preferably means is provided at 19 on the opposite ends of the gauge for the attachment of temporary marking disks for indicating the dimensions to which the gauge is adjusted. Each of these devices, as shown in Fig. 6, preferably comprises two disks 19 and 19′ held clamped to the opposite sides of the web 9 by means of a screw 20. Whenever the gauge contact members are adjusted to a new position the disks may be removed and other disks, with the proper marking stamped thereon to indicate the new setting, substituted therefor.

The general construction described and illustrated herein constitutes a gauge wherein the objects sought are fully attained in a very simple and substantial manner, and while the drawing illustrates only one practical application of the invention, it should be understood that the same is capable of other applications and may be embodied in other forms.

What I claim is:

1. A gauge having a contact member mounted to slide lineally therein, two independent devices engaging the member, and independent elements forming abutments adapted to contact with said devices and acting in opposite directions, said devices being adapted to adjust the member and lock it in adjusted position within the gauge and extending in the general direction of movement of the member.

2. A gauge having a contact member mounted to slide lineally therein and two opposed screws at one side of and engaging the member and acting in opposite directions thereon to adjust the member and lock it in adjusted position within the gauge.

3. A gauge having a contact member mounted to slide lineally therein and two opposed screws extending in opposite directions at the side of and engaging the member and acting in opposite directions thereon to adjust the member and lock it in adjusted position within the gauge, the said screws being substantially within the outlines of the gauge.

4. A gauge having a contact member mounted to slide lineally therein, two separate screw-threaded members threadedly engaging the exterior of the member and acting in opposite directions thereon, and independent elements forming abutments adapted to contact with said devices whereby the member may be adjusted and locked in adjusted position.

5. A gauge having a contact member mounted to a slide lineally therein, a sector of the periphery of the member being concaved and threaded along a portion of its length, and two separate screws engaging the said threaded portion to hold the member in place and acting in opposite directions thereon to adjust the member and lock it in adjusted position within the gauge.

6. A gauge having an opening therein, an adjustable contact member mounted in the opening, said contact member having screw threads formed on an exterior portion thereof, and two screws freely mounted in the gauge and each having bearing at its inner end in the said opening against longitudinal movement in one direction and threadedly engaging the screw-threaded portion of the contact member to adjust it and lock it in adjusted position.

7. A gauge having an opening therein, an adjustable contact member slidably mounted in the opening, an abutment means secured within the opening and opposed screws also mounted in the opening and bearing at their inner ends on the said abutment means, the said screws threadedly engaging the contact member and acting in opposite directions thereon to adjust the member and lock it in adjusted position.

8. A gauge having an opening therein, an adjustable contact member slidably mounted in the opening, two spaced transverse abutment pins secured in the opening and opposed screws also mounted in the opening each bearing upon one of said pins and threadedly engaging the member and acting in opposite directions thereon to adjust the member and lock it in adjusted position.

9. A gauge having an opening therein, an adjustable contact member mounted in the opening and a screw mounted at one side thereof and entirely within the opening, the said screw threadedly engaging the exterior of the contact member and having bearing within the opening against longitudinal movement.

10. A gauge having two intersecting bores therein extending in the same general direction, a contact member mounted in one bore and screw means extending parallel to said contact member mounted in the other bore, the screw means having engagement with the contact member to adjust it and lock it in adjusted position.

11. A gauge having two intersecting bores therein, a contact member mounted in one bore and two opposed screws mounted in the other bore and having bearing therein, the screws each threadedly engaging the contact member and acting in opposite directions thereon to adjust it and lock it in adjusted position.

12. A gauge comprising a U-shaped frame providing a pair of gauge arms, two opposed contact members mounted respectively in the said arms, and opposed independent adjusting devices extending parallel to and engaging one of the said members and acting in opposite directions thereon to adjust the member and lock it in adjusted position, the said devices being substantially within the outlines of the gauge.

13. A gauge comprising a U-shaped frame providing a pair of gauge arms, two opposed adjustable contact members mounted respectively in the said arms, and two opposed independent adjusting devices engaging each member and acting in opposite directions thereon to adjust the member and lock it in adjusted position, the said devices extending in the general direction of movement of the member they engage.

14. A gauge comprising a U-shaped frame providing a pair of gauge arms, two opposed contact members mounted respectively in the said arms, and two screws engaging one of the said members exteriorly thereof and acting in opposite directions thereon to adjust the member and lock it in adjusted position, the said screws extending in the general direction of movement of the member they engage.

15. A limit gauge comprising a U-shaped frame providing a pair of gauge arms, a plurality of pars of opposed contact members mounted in the arms, and two opposed independent adjusting devices extending parallel to and engaging one member of each of the said pairs and acting in opposite directions thereon to adjust the member and lock it in adjusted position, the said devices being substantially within the outlines of the frame.

16. A gauge comprising a U-shaped frame and opposed gauge contact members mounted in the ends thereof, the said frame comprising an inner flange and an outer flange, each flange being formed of a plurality of rectilinear intersecting sections, and a web integrally connecting the two flanges and latticed in such manner as to provide a plurality of integral braces extending from the said intersecting portions of one flange to the intersecting portions of the opposite flange.

17. A gauge comprising a U-shaped frame and opposed gauge contact members mounted in the ends thereof, the said frame comprising an inner flange and an outer flange, both such flanges being formed of a plurality of rectilinear sections, and a web integrally connecting the two flanges and latticed in such manner as to provide a plurality of integral braces between the two flanges, two such braces diverging from certain of the corners, formed by the intersection of the adjacent rectilinear sections, to the opposite flange.

18. A gauge comprising a U-shaped frame and opposed gauge contact members mounted in the ends thereof, the said frame comprising an inner flange and an outer flange, both such flanges being formed of a plurality of rectilinear sections, each rectilinear section of one flange being opposite the intersection of two rectilinear sections of the opposed flange, and a web integrally connecting the two flanges and latticed in such manner as to provide a plurality of integral braces between the two flanges, two such braces diverging from each flange corner of the latticed portion of the gauge to the two adjacent corners on the opposite flange.

In testimony whereof, I hereto affix my signature.

BRYANT H. BLOOD.